March 2, 1965 P. W. SCHWIMMER 3,171,336
IDENTIFICATION PHOTO CAMERA APPARATUS
Filed Dec. 19, 1961 6 Sheets-Sheet 1
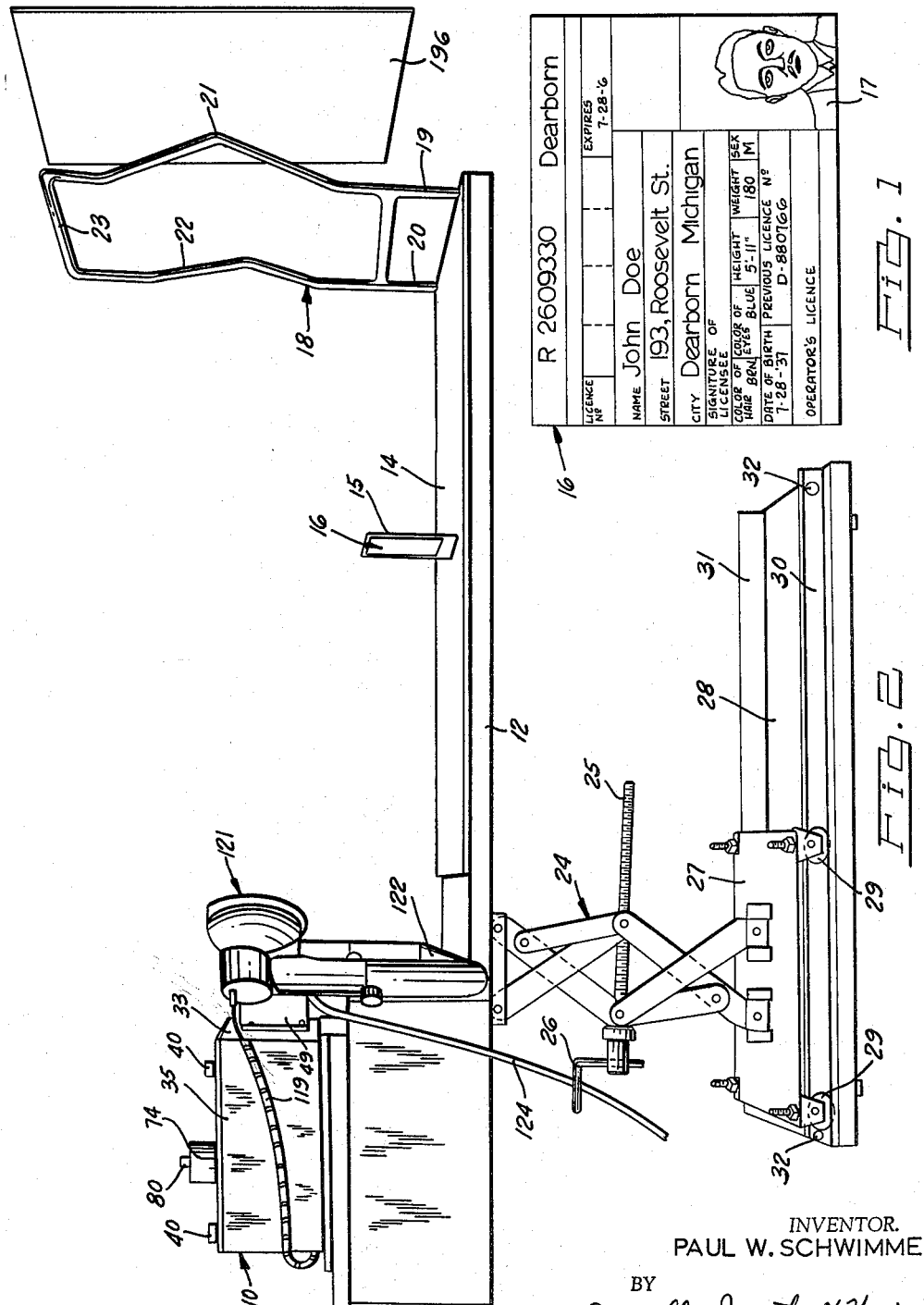
INVENTOR.
PAUL W. SCHWIMMER
BY
Donnelly, Mentag & Harrington
ATTORNEYS

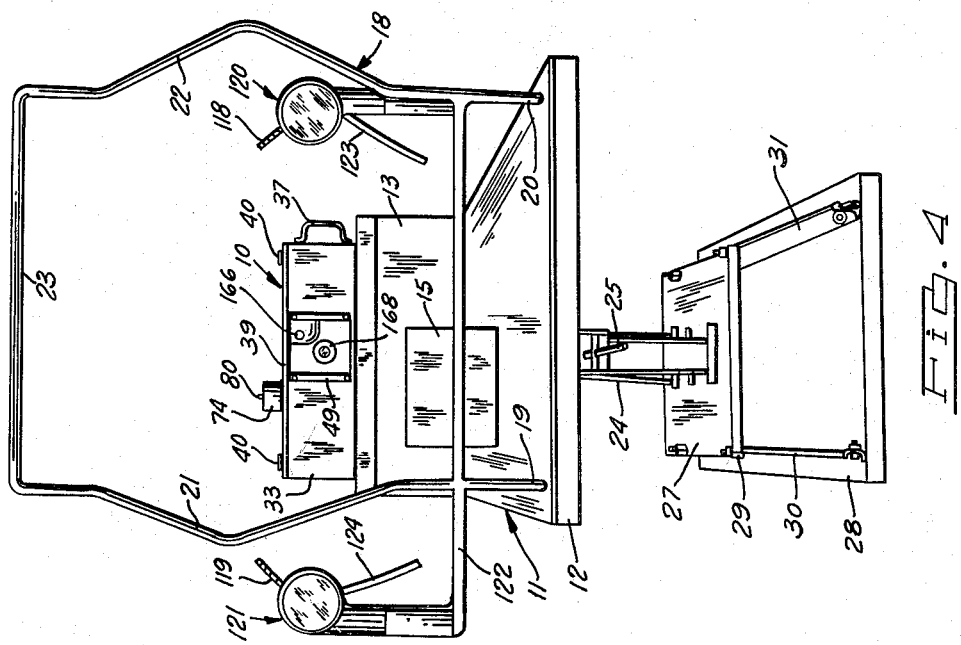

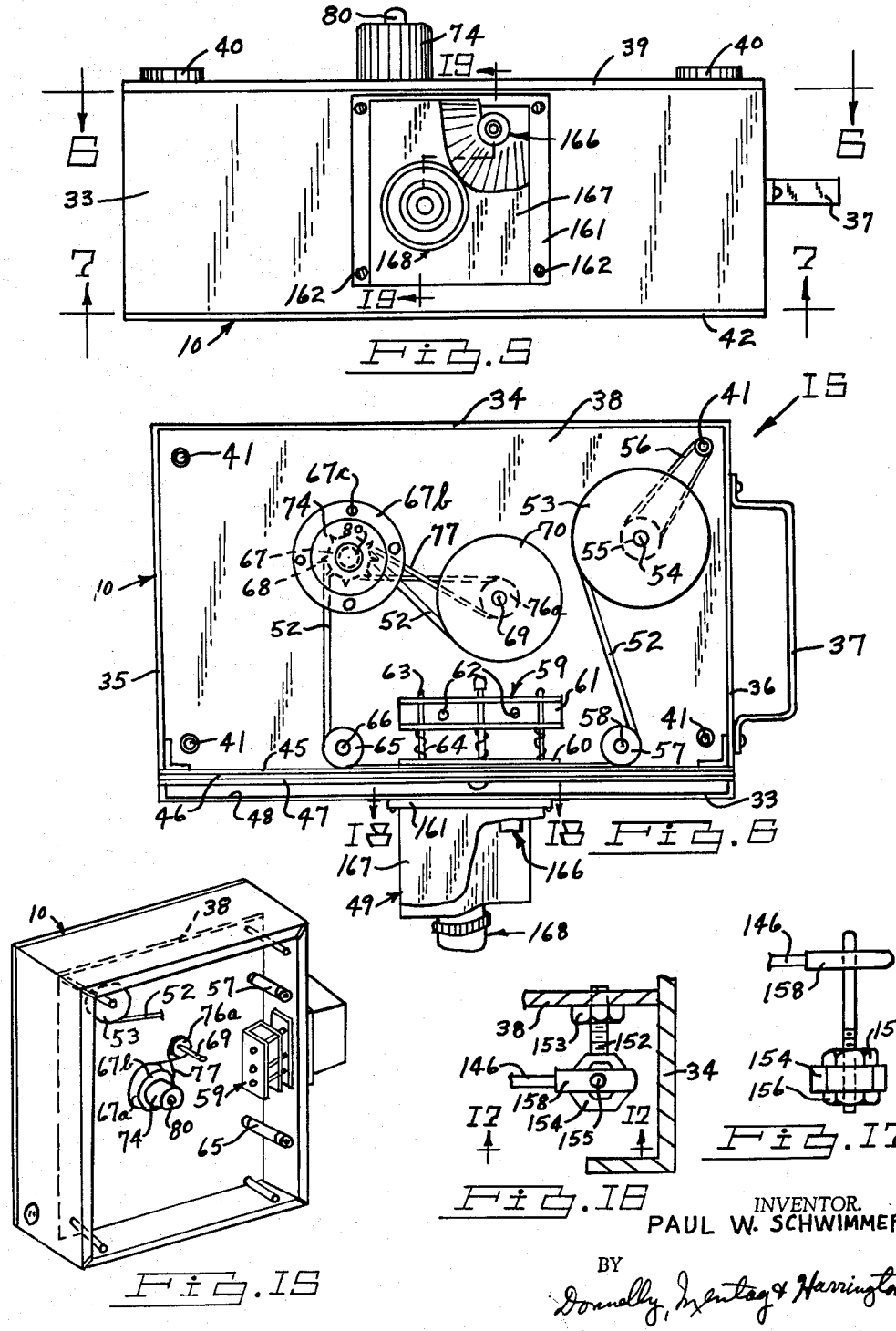

March 2, 1965 P. W. SCHWIMMER 3,171,336
IDENTIFICATION PHOTO CAMERA APPARATUS
Filed Dec. 19, 1961 6 Sheets-Sheet 4
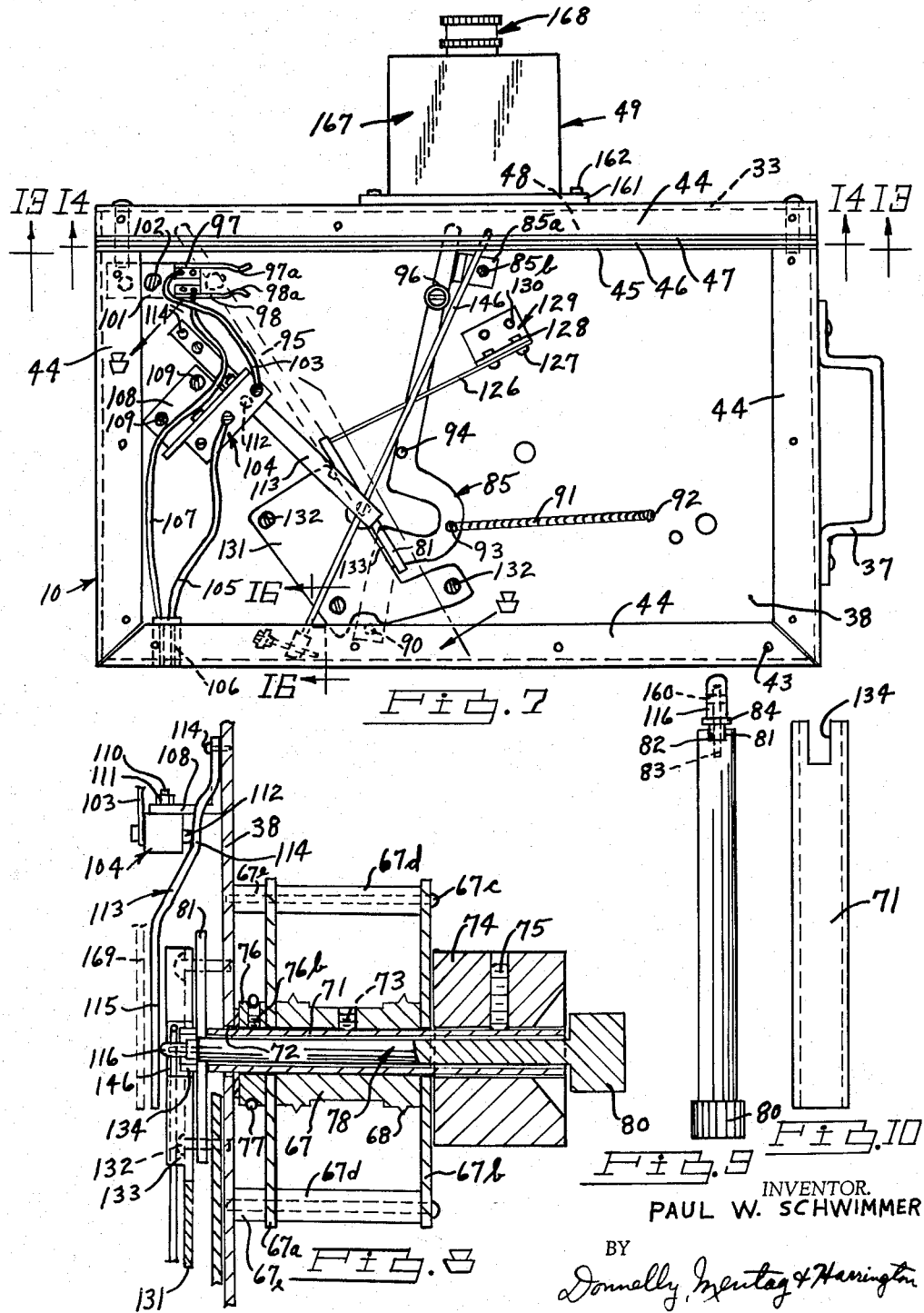
INVENTOR.
PAUL W. SCHWIMMER
BY
Donnelly, Mentag & Harrington
ATTORNEYS

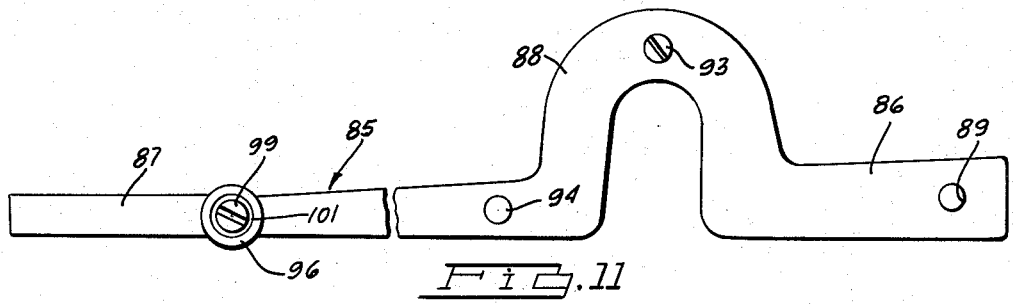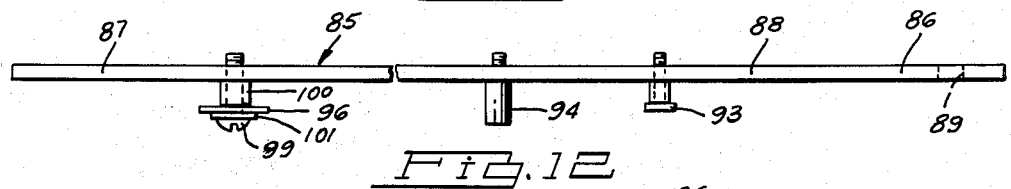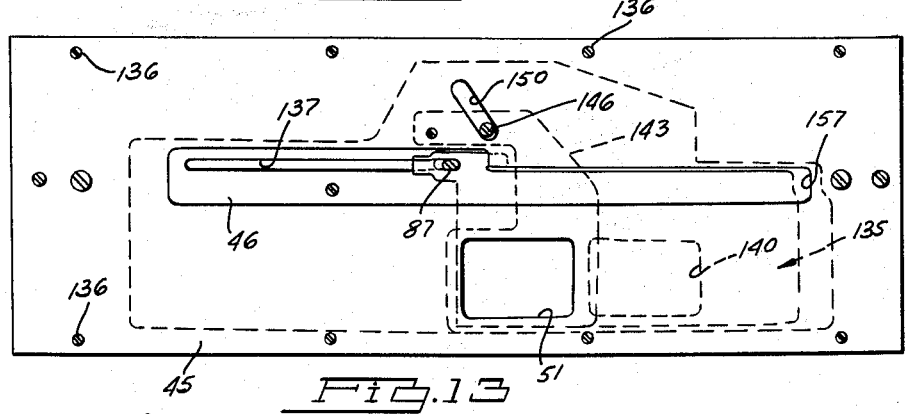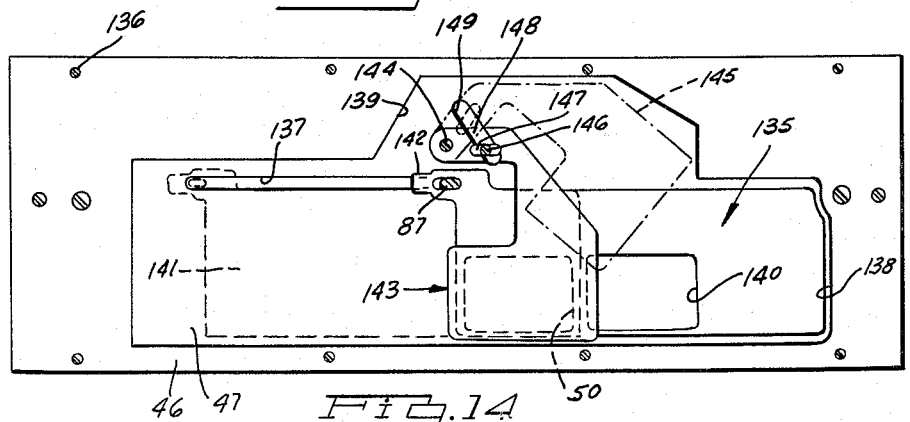

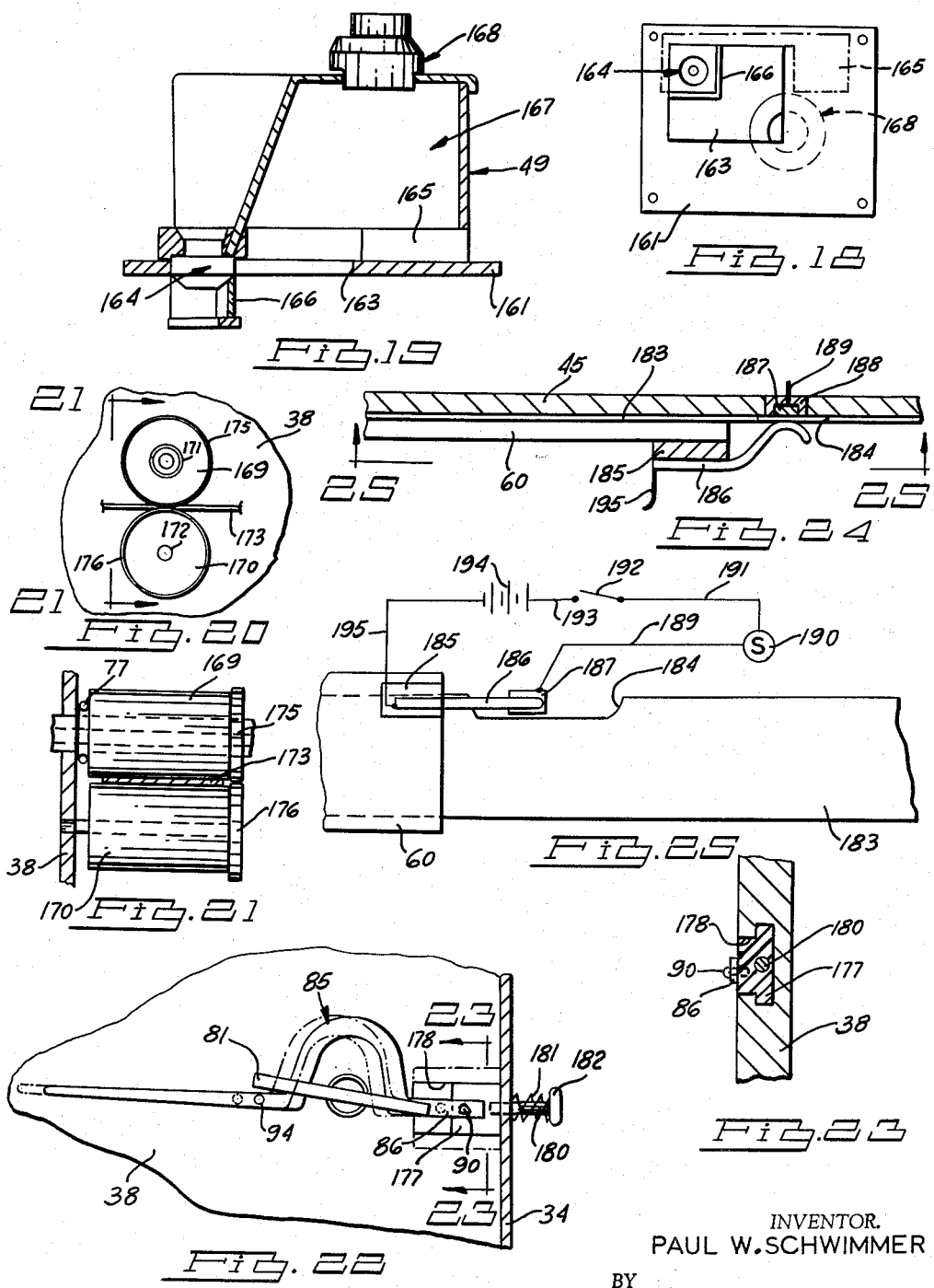

2

United States Patent Office 3,171,336
Patented Mar. 2, 1965

3,171,336
IDENTIFICATION PHOTO CAMERA APPARATUS
Paul W. Schwimmer, Redford Township, Wayne County, Mich., assignor to Photo Activities, Inc., Detroit, Mich., a corporation of Michigan
Filed Dec. 19, 1961, Ser. No. 160,444
8 Claims. (Cl. 95—1.1)

This invention relates to improvements in photographic cameras, and more particularly to, a novel and improved identification photo camera apparatus for making identification cards such as driver's licenses, club cards and the like by employing a photograph negative.

It is the primary object of the present invention to provide a photographic camera apparatus for making identification cards with person's pictures thereon wherein a person's picture is first taken simultaneously with the person's identification card containing the statistics of the person on photographic paper.

It is another object of the present invention to provide a novel and improved photo identification camera which is capable of rapid operation by an unskilled person, yet which is reliable so that any danger of producing an identification card having the correct statistics with the incorrect person's photograph, or vice versa, is at a minimum.

It is another object of the present invention to provide a photo identification camera apparatus which is economical of manufacture, simple and compact in construction, efficient in operation and easy to use.

It is still another object of the present invention to provide a novel and improved photo identification camera which is adapted to use photographic paper to produce a photographic negative and wherein the camera may be quickly and easily operated by an unskilled person by the operation of a single knob which is adapted to wind the film or photographic paper and reset the camera for succeeding pictures, and wherein the camera is adapted to be operated for taking the picture by merely pressing a button disposed in the center of said winding knob.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a front view of an identification card made with the camera of the present invention;

FIG. 2 is a side view of an illustrative identification photo camera apparatus made in accordance with the principles of the present invention;

FIG. 3 is a rear end view of the structure illustrated in FIG. 2, taken from the left end of FIG. 2;

FIG. 4 is a front end view of the structure illustrated in FIG. 2, taken from the right end of FIG. 2;

FIG. 5 is an enlarged front elevation view of the camera of the present invention;

FIG. 6 is a top plan view of the camera structure shown in FIG. 5, taken along the line 6—6 thereof, and with the top cover removed;

FIG. 7 is a bottom plan view of the camera structure shown in FIG. 5, taken along the line 7—7 thereof, and with the bottom cover removed;

FIG. 8 is an enlarged, fragmentary elevational section view of the structure illustrated in FIG. 7, taken along the line 8—8 thereof and looking in the direction of the arrows;

FIG. 9 is an enlarged view of the rod and release button employed for actuating the camera;

FIG. 10 is an enlarged view of the hollow sleeve shaft employed for mounting the film wind-up and the release button and rod;

FIG. 11 is a broken, side elevational view of the shutter lever employed in the structure illustrated in FIGS. 7 and 8;

FIG. 12 is a top view of the structure illustrated in FIG. 11;

FIG. 13 is a vertical, sectional view, slightly enlarged, of the structure illustrated in FIG. 7, taken along the lines 13—13 thereof, and looking in the direction of the arrows;

FIG. 14 is an elevational sectional view of the structure illustrated in FIG. 7, showing the structure slightly enlarged, and taken along the lines 14—14 thereof and looking in the direction of the arrows;

FIG. 15 is an elevational perspective view of the structure illustrated in FIG. 6, slightly reduced, and taken in the direction of the arrow 15;

FIG. 16 is a fragmentary elevational sectional view of the structure illustrated in FIG. 7, slightly enlarged, taken along the lines 16—16 thereof and looking in the direction of the arrows;

FIG. 17 is a fragmentary elevational sectional view of the structure illustrated in FIG. 16, taken along the lines 17—17 thereof and looking in the direction of the arrows;

FIG. 18 is an elevational sectional view of the structure illustrated in FIG. 6 with the structure slightly enlarged, taken along the lines 18—18 thereof and looking in the direction of the arrows;

FIG. 19 is a fragmentary elevational sectional view of the structure illustrated in FIG. 5, showing the structure slightly enlarged, taken along the lines 19—19 thereof and looking in the direction of the arrows;

FIG. 20 is a fragmentary elevational view of a pair of modified film feed rollers adapted for use in the invention;

FIG. 21 is an elevational view, slightly reduced, of the structure illustrated in FIG. 20, taken along the lines 21—21 thereof and looking in the direction of the arrows;

FIG. 22 is a fragmentary side elevational view of a modified shutter lever structure adapted to be employed in the invention;

FIG. 23 is a fragmentary elevational sectional view of the structure shown in FIG. 22, taken along the lines 23—23 thereof and looking in the direction of the arrows;

FIG. 24 is a fragmentary side elevational view of a modified pressure plate employed in the invention; and FIG. 25 is a fragmentary elevational view of the structure illustrated in FIG. 24, taken along the lines 25—25 thereof and looking in the direction of arrows.

Referring now to the drawings, the numeral 10 generally indicates the novel identification photo camera employed in the present invention and the numeral 11 generally indicates the stand on which the camera is operatively mounted. The stand 11 will be described in detail first, and then the camera 10 will be described in detail.

As shown in FIGS. 2, 3 and 4, the stand 11 includes an elongated platform 12 which is rectangular in overall configuration and which has a fixedly mounted platform 13 on the rear end thereof. The second named platform 13 extends above the base platform 12 approximately ten inches and functions as a camera support for the camera 10. The platform portion 13 is box-shaped in configuration. The upper side of the elongated platform 12 is provided with a non-glare surface board as 14 which may be of any suitable material and which is preferably white in color. Fixedly mounted on the top surface of the platform 12 is an identification card holder or frame 15 into which is adapted to be mounted an identification card as 16, and which is to be photographed simultaneously with the person to whom the card belongs whereby the card owner's picture will appear in the photograph of the identification card 16 at the position indicated by the numeral 17 in FIG. 1.

Fixedly mounted on the front end of the platform 12 is a substantially rectangular frame generally indicated by the numeral 18 which is used for positioning a person whose picture is to be taken relative to the identification card 16 and camera 10. As best seen in FIG. 4, the frame 18 is provided with the spaced apart vertical legs 19 and 20 which are suitably fixedly mounted in the front end of the platform 12. The frame legs 19 and 20 are provided with the outwardly extended V portions 21 and 22, respectively, at a point approximately mid-way along the length thereof. The upper ends of the frame legs 19 and 20 are integrally connected by means of the cross-bar 23.

As shown in FIGS. 2, 3 and 4, the platform 12 is fixedly mounted by any suitable means on the upper end of a jack, generally indicated by the numeral 24, which is a conventional scissors-type jack. The jack 24 is operated by the threaded rod 25 which is provided with the operating handle 26. Any suitable jack may be used for the jack 24 since it functions to elevate the platform 12 upwardly and downwardly. The lower end of the jack 24 is fixedly mounted on the base plate 27 by any suitable means, as by being welded thereon. The base plate 27 is rotatably mounted on the larger base plate 28 as shown in FIGS. 2, 3 and 4. The first named base plate 27 is provided with a suitable roller as 29 on each corner thereof, and this base plate is rectangular in overall configuration. The rollers 29 are adapted to be rotatably mounted for forward and rearward movement of the base plate 27 relative to the base plate 28 in the longitudinally extended tracks 30 and 31. The tracks 30 and 31 are mounted on the larger base plate 28 which is rectangular in configuration and these tracks are provided with the stop members 32 at each end thereof. It will be seen that the camera 10 may be adjusted forwardly and backwardly relative to a person whose picture is to be taken by moving the base plate 27 relative to the base plate 28. The camera 10 may be elevated upwardly and downwardly relative to the person whose picture is to be taken, by means of the jack 24.

The camera 10 comprises a substantially rectangular case having the front wall 33, the rear wall 34, and the side walls 35 and 36. As shown in FIGS. 5 and 6, the camera is provided with a carrying handle 37. The camera case or housing is divided internally, by a horizontally disposed panel or dividing wall 38, into an upper compartment and a lower compartment. The upper compartment is shown in FIG. 6 and the lower compartment is shown in FIG. 7. The upper compartment is enclosed by means of the top wall or plate 39 which is fixedly secured in place by means of suitable lock nuts 40 for operative engagement with the screws 41 that protrude the cover or top wall 39. Substantially all of the operating mechanism for the camera 10 is mounted on the underside of the panel 38 within the lower compartment as shown in FIG. 7. The upper compartment comprises the film magazine as shown in FIG. 6. The lower compartment of the camera 10 is enclosed by the bottom plate or wall 42 which is fixedly secured in place by any suitable means, as by suitable screws which pass through the plate 42 and into suitable holes as 43 in the flanges 44 formed on the lower end of the side walls, the front walls and back walls of the case, as shown in FIG. 7. The various walls and panels of the camera 10 are formed so as to be free of any leakage of light therethrough.

As shown in FIGS. 6, 7, 13 and 14, the camera 10 includes the shutter means mounted on the front side thereof and which comprises shutter elements operatively mounted in the three plates 45, 46 and 47. The shutter plates are disposed inwardly from the front wall 33 to provide a longitudinally extended compartment 48 therebetween. The shutter means will be described in detail hereinafter. Operatively mounted on the outer side of the front wall 33 at a central position on the case is a lens mechanism generally indicated by the numeral 49 and which is described in detail hereinafter.

As shown in FIGS. 13 and 14, the shutter means outer plate 47 is provided with the opening 50 which communicates with the compartment 48. The inner shutter means plate 45 is also provided with a similarly shaped hole 51 as show in FIG. 13, and it is past the hole 51 that the film 52 is moved and positioned for taking pictures by the camera 10. The shutter means will be described in detail hereinafter and the film magazine structure will be described next.

As shown in FIGS. 6 and 15, the film 52 is adapted to pass by the opening or focal plane 51 formed in the plate 45 as the camera 10 is operated. The film 52 may be any suitable conventional photographic film or photograph paper for producing a photographic negative. A film supply spool 53 is rotatably mounted within the film magazine about the pin 54 which is fixedly mounted in the panel 38. The film supply spool 53 is provided with a pulley 55 integrally formed on the inner side thereof and around which is mounted a spring 56. The spring 56 is formed as a continuous loop or belt and is also mounted around the cover mounting pin or screw 41, and the spring 56 applies a reverse bias on the spool 53 to prevent the film 52 from unwinding before or without the application of pulling tension to the film by means of the following described film take-up structure.

As shown in FIG. 6, the film or photographic paper 52 feeds off from the bottom of the top spool 53 over the upper guide roller 57 which is mounted on the pin or spindle 58 and thence through the film guide means, generally indicated by the numeral 59. The film guide means 59 includes the pressure plate 60 which maintains a bias against the inside of the film 52 and holds it against the inner side of the plate 45 as the film passes over the focal plane or opening 51. The film guide means 59 further includes the channel shaped carrier member 61 which has the web portion thereof fixedly secured to the panel 38 by any suitable means, as by the screws 62 and which is provided with a pair of spaced apart flanges as shown in FIGS. 6 and 15. The member 61 may also be termed a supporting bracket. Fixedly secured to the pressure plate 60, as by being threaded into the back side thereof, are a plurality of guide pins 63 which are adapted to slide through suitable apertures in the flanges of the bracket 61. A spring 64 is mounted around each of the guide pins 63 between the inner flanges of the bracket 61 and the inside face of the pressure plate 60, and these springs serve to maintain a continual outwardly directed bias on the pressure plate 60 for maintaining the film 52 against the inner face of the plate 45.

As shown in FIG. 6, the film 52 leaves the lower end of the pressure plate 60 and passes over the bottom guide roller 65 which is operatively mounted on the spindle 66 fixed on the panel 38. The film then passes up and over the sprocket 67 which is provided with suitable gear teeth 68 for meshing engagement with the perforated sides of the film, or photographic paper, in the usual manner. The sprocket 67 is mounted on the spindle 71. The film 52 is then fed onto the film take-up spool 70 which is detachably secured to the shaft or spindle 69. As shown in FIG. 8, the tubular shaft 71 is rotatably mounted in the hole 72 formed through the dividing panel 38. The sprocket 67 may be detachably secured by any suitable means, as by means of the set screw 73, to the spindle 71. As shown in FIGS. 6, 8 and 15, a winding knob 74 is also detachably secured to the shaft 71 on the outer end thereof by means of the set screw 75. The knob 74 is adapted to wind the film onto the take-up spool 70. As shown in FIG. 8, the winding shaft 71 is provided with a suitable pulley 76 over which is operatively mounted the spring belt 77 which is also mounted around a similar pulley 76a on the inner side of the take-up spool 70 for driving the spool 70 when the shaft 71 is turned by the knob 74. The pulley 76 may be secured to the shaft 71 by any suitable means, as by means of the set screw 76b. A pair of circular film guide plates 67a and 67b are mounted on opposite ends of the sprocket 67 and are fixed to the panel 38 by means of suitable bolts 67c and sleeve spacers 67d and 67e. The shaft 71 extends through suitable holes in the plates 67a and 67b as shown in FIG. 8.

As shown in FIGS. 6, 8 and 9, the numeral 78 generally indicates a release mechanism which is adapted for making the exposure or taking the picture. The member 78 includes the shaft 79 which is provided on the outer end thereof with the enlarged head or button 80 and on the inner end thereof with the cross arm 81. The cross arm 81 may be secured to the inner end of the shaft 79 by any suitable means as by welding. As shown, the cross arm 81 is seated in the transverse slot 82 formed on the inner end of the shaft 79, and it is secured in the slot 82 by means of the lock nut 84 and the threaded bolt 83 which passes through the cross arm 81 and is threaded into the shaft 79. As shown in FIG. 8, the inner end of the shaft 79 is disposed on one side of the dividing panel 38 and the release button 80 is disposed on the other side. The release button 80 extends outwardly through the winding knob 74, and as shown in FIGS. 2, 3 and 4, the winding knob 74 extends outwardly and upwardly through the top cover plate 39 whereby the knob 74 and the button 80 may be operated from the outside of the camera 10. The cross arm 81 is disposed inside of the lower operating mechanism compartment and functions with the other operating mechanism in a manner as more fully described hereinafter.

As shown in FIGS. 7, 11 and 12, the camera 10 of the present invention includes a shutter operating lever generally indicated by the numeral 85 and which is swingably mounted in the lower camera compartment. The shutter lever 85 includes the rear straight portion 86, the front straight portion 87 and the interconnecting inverted U-shaped portion 88. The front straight portion 87 is approximately three times as long as the rear straight portion 86. The rear straight portion 86 of the lever 85 is provided with the hole 89 therethrough for the reception of the screw 90 for pivotally and swingably securing the shutter on the underside of the dividing panel 38. The shutter lever 85 is normally biased to the position shown in FIG. 7 by means of the spring 91 which has the one end thereof fixedly connected to the pin 92 mounted on the panel 38, and on the other end thereof secured to the retainer screw 93 mounted on the inverted U-shaped portion 88 of the shutter lever 85. In the position shown in FIG. 7 the front end 87 of the lever 85 engages the L-shaped stop bracket 85a which is secured to the panel 38 by means of the screw 85b. As shown in FIGS. 7, 11 and 12, the shutter lever 85 is provided with the screw mounted outwardly extended stud 94 which is adapted to be engaged by the cross arm 81 when the winding knob 74 is turned so that the lever 85 will be swung downwardly to the dotted line position shown in FIG. 7 and indicated by the numeral 95. When the shutter lever 85 is swung to the dotted line position 95, it carries out a shutter cocking function. When the lever 85 is returned by the spring 91 to the solid line position in FIG. 7 a circuit completion function is carried out.

The circuit completion function is carried out by the lever 85 by means of the brass circular contact member 96 on the front end 87 of the lever being simultaneously electrically in contact with both of the stationary contact curved portions 97a and 98a of the spring contacts 97 and 98 when the lever 85 is swung to the solid line position in FIG. 7. The round brass contact closure member 96 is fixedly secured to the long front end of the lever portion 87 by means of the screw 99 which is insulated from the contact 96 by any suitable insulation sleeve 100 and insulation washer 101a. The two contacts 97 and 98 may be termed the synchronizer contacts and they are fixedly secured to the strip of insulating material 101 which is in turn secured to the panel 38 by means of the screws 102. As shown in FIG. 7, the contact 97 is connected by means of the lead wire 103 to one terminal of a micro-switch 104. The other terminal of the micro-switch 104 is connected by means of the lead wire 105 to one of the prongs in the conventional electric plug receptacle 106 of the male type. The other contact 98 is connected by means of the lead wire 127 to the other prong of the male plug 106.

As shown in FIGS. 7 and 8, the micro-switch 104 is fixedly secured to the panel 38 by any suitable means, as by means of the L-shaped bracket 108 which is secured to the panel 38 by the screws 109 and to the micro-switch by the mounting bolts 110 and lock nuts 111. The micro-switch 104 is provided with the usual operating button 112 which is adapted to be operated by the spring arm 113. As shown in FIGS. 7 and 8, the spring arm 113 has a fixed end which is secured to the panel 38 at a point adjacent the micro-switch 104. As shown in FIG. 8, the spring arm 113 extends outwardly away from the panel 38 and is provided with a first flat portion 114 which is adapted to engage the micro-switch operating button 112 and with a second further outwardly disposed flat portion 115 which is adapted to be engaged and pushed outwardly by the shutter release shaft 78. As shown in FIGS. 8 and 9, the spring arm portion 115 is engaged by the rounded outer end of the pusher member 116 which is slidably and rotatably mounted on the outer non-threaded end of the screw 83 carried on the shutter release shaft 78 when the shutter release button 80 is pressed inwardly or to the left as shown in FIG. 8, and as more fully described hereinafter.

As shown in FIGS. 3 and 4, an electrical female plug 117 is adapted to be operatively inserted into the male plug 106. The plug 117 is provided with the two lead wires 118 and 119 which are operatively connected to one terminal of the electrical circuit of a conventional photographic light, as for example the lights indicated by the numerals 120 and 121, respectively. Any suitable photographic lights may be used for the lights 120 and 121. As shown in FIGS. 3 and 4, the lights 120 and 121 are mounted on opposite ends of the cross arm 122 which is fixedly secured on the top of the platform 12 by any suitable means, and with the lights 120 and 121 disposed sidewardly outwardly from the camera 10 and along the front side thereof.

As shown in FIG. 3, the other terminal of the circuits in each of the lights 120 and 121 is connected by means of suitable lead wires as 123 and 124 to the plug 125 which is adapted to be plugged into any suitable 120 volt alternating current source. It will be understood from the aforegoing description of the lighting circuit that the lights 120 and 121 are connected in an electrical series circuit, and that before these lights are energized, the synchronizer contact portions 97a and 98a must first be bridged and connected by means of the contact button 96 when the shutter lever 85 is released and returned upwardly back to the solid line position of FIG. 7.

As shown in FIG. 7, the camera 10 is provided with a flexible elongated strip of metal which functions as a leaf spring and is indicated by the numeral 126. The spring arm or lever 126 has the one end thereof fixedly secured by any suitable means, as by rivets 127, to the vertical leg 128 of a bracket 129 which is secured to the panel 38 by the screws 130. When the cross arm 81 connected to the shaft 78 is turned counter-clockwise as viewed in FIG. 7, it will engage the one side or face of the spring lever 126 and flex it outwardly until the cross arm passes underneath the same and this occurs when the lever 85 has been moved downwardly between the contacts 97 and 98. The spring lever 126 prevents the cross arm 81 from being turned backwardly.

As shown in FIGS. 7 and 8, the operating mechanism of the camera 10 further includes a blocking plate indicated by the numeral 131 which is fixedly secured to the lower face of the panel 38 by means of a plurality of screws 132. The plate 131 is retained in place in a spaced apart position from the panel 38 as shown in FIG. 8. The upper edge of the blocking plate 131 is folded over downwardly along a portion thereof to form a flange 133. The blocking plate 131 serves two functions. First, when the button 80 is partially depressed it is not possible to turn the knob 74 since the cross arm 81 will be prevented from rotation because it will engage the flange 133. The blocking plate flange 133 also prevents the button 80 from being operated when the knob 74 has been partially turned since the cross arm 81 will be located between the plate 131 and the panel 38 and may not be moved outwardly or to the left as shown in FIG. 8. It will be noted that the cross arm 81 on the shutter release shaft 78 is adapted to be slidably mounted in the cross slot 134 on the inner end of the tubular shaft 71.

The shutter structure and operating means will now be described in detail. As shown in FIG. 7, the outer end of the shutter operating lever 85 extends through the shutter mechanism plates 45, 46 and 47 and the outer end 87 of this lever operatively engages the shutter 135 shown in FIG. 14 and moves it between the operative and inoperative positions. The shutter plates 45, 46 and 47 are secured to the dividing panel 38 and the outer walls of the camera casing by suitable screws, as 136, which pass through suitable aligned holes formed in these plates. The outer shutter plate 47 is provided with the shutter opening or focal plane 50 and with the longitudinally disposed slot 137 through which is adapted to pass the front end 87 of the shutter lever 85. The spacer plate 46 is provided with the elongated opening 138 which is extended sidewardly outwardly as indicated by the numeral 139. It will be seen that the substantially rectangular shutter 135 is adapted to slide in the longitudinal portion of the opening 138. The shutter 135 is shown in FIG. 14 in the inoperative or uncocked position whereby the one end thereof is in position to close the shutter opening 50 in the plate 47. The shutter 135 is provided with the opening 140 whereby when the shutter 135 is moved to the left as viewed in FIG. 14, to the cocked dotted line position indicated by the numeral 41, the opening 140 will be disposed to the left of the shutter opening 50. The shutter 135 is provided with the outwardly and inwardly extended operating arm 142 on one corner thereof through which is formed a suitable hole in which the shutter arm 87 is mounted.

The shutter means further includes the capping blade, indicated by the numeral 143, which includes a portion adapted to cover the opening 50 when it is in the solid line position shown in FIG. 14. The capping blade 143 is carried on a substantially L-shaped arm which has one of the legs thereof pivotally mounted on the pin 144 whereby the capping blade may be swung to the uncovering position which is indicated by the dotted line position marked 145 in FIG. 14. The capping blade 143 is operated between the solid line and dotted line positions shown in FIG. 14 by means of the elongated spring rod 146 which passes through the elongated hole 147 in the arm 148 of the capping blade. The capping blade operating rod 146 also extends through the upwardly sloping elongated slot 149 formed in the plate 47 and through a mating, aligned slot 150 (FIG. 13) in the plate 45. It will be seen that when the operating rod 146 is moved upwardly as viewed in FIGS. 13 and 14, along the slots 150 and 149, the capping blade 143 will be swung from the solid line covering position of FIG. 14 to the dotted line uncovering position 145 of FIG. 14. As shown in FIG. 13, the inner shutter plate 45 is provided with the elongated slot 151 which extends longitudinally of the plate 45 so as to expose the shutter lever slot 137 and permit the shutter lever portion 87 to be moved throughout the length of slot 137.

As shown in FIGS. 7, 8, 16 and 17, the capping blade control or operating rod 146 extends transversely across the lower compartment and slidably passes through the aperture 160 in the pusher member 116 which is rotatably and slidably mounted on the outer end of the screw 83, whereby when the shaft 71 is moved outwardly or to the left as shown in FIG. 8, the capping blade operating rod 146 will operate the capping blade 143. The rear end of the operating rod 146 is provided with the enlarged head 158 which is provided with the hole 159 for the reception of the rod 155. The rod head 158 is slidably and pivotally mounted on the rod 155. The rod 155 is threaded on one end which is secured in the enlarged head 154 of the bolt 152 by means of the lock nuts 156 and 157. The other end of the bolt 152 is threadably mounted in the panel 38 and secured in place by means of the lock nut 153. It will be seen that the enlarged head 158 of the rod 146 may swivel on the rod 155 during a capping blade operating movement.

As shown in FIGS. 18 and 19, the lens mechanism 49 includes the base plate 161 which is fixedly secured to the front plate 33 by any suitable means as by means of the screws 162. The base plate 161 is provided with the focal aperture or opening 163. A short focus lens 164 is operatively mounted in a substantially U-shaped frame 165 which is fixedly mounted on the outer side of the plate 161. The short focus lens 164 is adapted to photograph the person. A partition extends inwardly along the inner side of the short focus lens 164 and this partition is indicated by the numeral 166 in FIG. 19. Fixedly mounted on the outer side of the plate 161, and covering the same and part of the frame 165 with the exception of the short focus lens 164, is the long lens housing 167. Operatively mounted in the outer front wall of the housing 167 is the long focus lens 168 which photographs the person's identification card 16 or other documents. The lenses 164 and 168 may be of any suitable conventional type.

In the use of the apparatus of the present invention, a person's identification card 16 or the like would be mounted in the bracket 15 and the person would be positioned behind the outline frame 18. The position of the frame 18 may be adjusted relative to a person by means of the adjusting jack 24 and the movably mounted support table 27. The entire camera apparatus may be mounted on a table or the like for operation thereof. Assuming the camera 10 has been supplied with film or photographic paper, the winding knob 74, as viewed in FIG. 6 would be turned clockwise whereby the cross arm 81 would bear against the pin 94 on the shutter lever 85 and the lever 85 would be moved to the dotted line position 95 as shown in FIG. 7. The aforedescribed movement of the shutter lever 85 would move the shutter 135 to the cocked dotted line position 141 as shown in FIG. 14. The capping blade 143 is in the normal full line covering position shown in FIG. 14 and the camera is ready for operation. The operator then pushes inwardly on the shutter release button 80 to take the picture of the person and his card. When the button 80 is pushed inwardly the shaft 78 is moved inwardly, to the left as viewed in FIG. 8, and the cross arm 81 will move outwardly over the flange 133 and the spring arm 113 will be moved outwardly to the dotted line position 169. When the shaft 78 has completed about ⅓ of its inward movement the spring arm 113 operates or closes the micro-switch button 112 and simultaneously the capping control rod 146 is moved outwardly to start moving the capping blade 143 to the dotted line position 145 as shown in FIG. 14. Further inward movement of the release button 80 will allow the cross arm 81 to move off of the pin 94 and the shutter lever 85 will be returned to the solid line position shown in FIG. 7 by means of the return spring 91. The camera is so timed that at the instant that the content plate 96 on the returning or moving lever 85 engages the curved contacts 97a and 98a the capping blade has been completely opened and the shutter opening 140 in the moving shutter 135 is aligned with the focal opening 50 and the picture it taken. When the button 80 is released, the spring 113 will be turned outwardly or to the right as viewed in FIG. 8 and the capping blade rod 146 will be returned to its initial position as shown in FIG. 14 and the capping blade 143 will be returned to the solid line position shown in this figure. The operator then turns the winding knob 74 another half turn whereby the shutter lever 85 will be moved downwardly again to the shutter cocking position shown by the dotted line position 95 in FIG. 7, and the camera 10 is again set up for another picture.

It will be seen that a person without any special training may operate the apparatus of this invention because of its simplicity, the few steps needed to operate the apparatus, and because of the built-in safety characteristics of the apparatus. For example, it is not possible to make a double exposure because the shutter operating mechanism will not function again or a second time until the control knob 74 is turned so as to again cock the lever 85 and when this happens the film is advanced to the next frame.

The camera of the present invention may be adapted for any size film since the camera may be made to any desired size. Experience has shown that apparatus of the present invention is practical and efficient in operation. The camera 10 may be provided with regular film or it may be provided with photographic paper to carry out the method of making identification cards as disclosed and claimed in my co-pending application entitled Method of Making Identification Cards With Pictures, Serial No. 810,127, filed on April 30, 1959. The term "shutter means" in the claims is used to include the capping blade 143. The term "film" as used in the claims includes perforated film, unperforated film, and also photographic paper. The numeral 196 in FIG. 2 indicates a white screen which is preferably positioned behind a person whose picture is being taken.

FIGS. 20 and 21 illustrate a modified film drive roller means for use with unperforated film or photographic paper. The rubber roller means shown in FIGS. 20 and 21 would replace the sprocket drive roller 67 as shown in FIG. 8. The numerals 169 and 170 indicate a pair of rubber rollers which are rotatably mounted on suitable shafts 171 and 172, respectively. The shaft 172 would be fixedly mounted by any suitable means in the dividing panel 38 and the shaft 171 would be constructed the same as shaft 71. The unperforated film or photographic paper is indicated by the numeral 173. The one roller, 169, would be provided with a suitable pulley 174 for operative engagement with the drive belt 77 for driving the film take-up roller 70. The pulley 174 would be fixedly secured to the shaft 171 by any suitable means. The roller 169 would be provided with a suitable fixedly mounted gear 175 for driving a similar gear 176 fixedly mounted on the roller 170.

FIGS. 22 and 23 illustrate a modified structure for locking the shutter lever 85 in an inoperative position for disabling the shutter means. The device shown in FIGS. 22 and 23 is adapted to hold the shutter lever 85 in the upwardly disposed inoperative position so that the film leader and trailer may be wound off of the film system without operating the shutter. In FIGS. 22 and 23, the numeral 177 indicates a T-shaped slide member which is adapted to be slidably mounted in a similar T-shaped slot 178 formed in the dividing panel 38. The rear end 86 of the shutter lever 85 is pivoted by means of the pivot member 90 on the slide member 177.

An operating rod 180 is fixedly secured to the outer side of the slide member 177 and this rod extends outwardly through the casing sidewall 34. The outer end of the rod 180 is provided with the enlarged head 182 and a return spring 181 is mounted around the rod 180 between the casing wall 34 and the head 182 so as to normally bias the slide member 177 to the right as shown in FIG. 22 against the case wall 34 into a shutter lever operative position. It will be seen that when the slide member 177 is moved to the left by means of the rod 180 to the dotted line position 179 of FIG. 22, the cross rod 81 may be turned without engaging the pin 94 on the shutter lever 85.

FIGS. 24 and 25 illustrate a further modification of the invention wherein the camera is provided with means for signalling the end of a leader portion of a roll of film, or the start of a trailer portion of a film whereby the start and ending of the useful portion of a roll of film may be indicated by either a sound buzzer or a signal lamp. In order to use the structure of FIGS. 24 and 25, the film 183 would be provided with an elongated notch 184 along one side thereof. The notch 184 would be made at the end of the film leader and at the start of the film trailer. The camera would be provided with a first fixedly mounted electrical contact 187 which would be mounted in a suitable insulator 188 in the shutter inner plate 45 and at a position under one edge of the film 183. When the notch 184 in the film 183 is positioned over the contact 187, the second spring contact 186 will make electrical contact with the fixed contact 187 to energize a signalling circuit. The spring contact 186 would be fixedly mounted on a suitable insulator block 185 mounted on the pressure plate 60. The fixed contact 187 would be connected by a suitable lead wire 189 to an indicating mechanism 190 which may be either a signalling light, a sound buzzer, or the like. The other side of the signalling means 190 would be connected by means of the lead wires 191 and 193, and a suitable hand switch 192 to a battery or other power source 194. The other side of the battery would be connected by means of a lead wide 195 to the spring contact 186. The manually operated switch 192 is a safety switch which would disable the signalling circuit when it is desired to put the signalling system in an inoperative condition.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. An identification photographic apparatus for taking a simultaneous photograph of a person and a statistic card of said person thereon, comprising:
   (a) a camera including a case,
   (b) a panel dividing said case into an upper compartment and a lower compartment,
   (c) said case being provided with an exposure opening through the front side of said upper compartment,
   (d) a film supply spool mounted in said upper compartment,
   (e) a film guide means mounted in said upper compartment for guiding film from said supply spool past said exposure opening,
   (f) a film take-up spool mounted in said upper compartment for receiving exposed film from said film guide means,
   (g) a tubular shaft rotatably mounted in said dividing panel and having the lower end thereof extended through said panel and into said lower compartment,
   (h) a manually operated winding knob mounted on said tubular shaft for rotating the same and being extended upwardly outwardly of said case,
   (i) lens means mounted on the front side of said case over said exposure opening,
   (j) shutter means mounted on the front side of said case for selective exposing and closing of said exposure opening,
   (k) mechanically actuated shutter operating means mounted in said lower compartment including shutter cocking and releasing means, (*l*) means operatively mounted in said tubular shaft for mechanically actuating said shutter releasing means;

(*m*) means mechanically interconnecting the lower end of said tubular shaft in said lower compartment and the shutter cocking means for mechanically actuating said shutter cocking means when the tubular shaft is rotated by said knob; and (*n*) drive means interconnecting said tubular shaft and said film take-up spool for turning the film take-up spool when the tubular shaft is rotated.

2. The structure as defined in claim 1, wherein: said drive means interconnecting said tubular shaft and said film take-up spool for turning the film take-up spool when the tubular shaft is rotated includes a pulley on said tubular shaft and a pulley on said take-up spool, and a spring belt operatively mounted about said pulleys.

3. The structure as defined in claim 2, wherein: said lens means includes a short focus lens for photographing the person and a long focus lens for photographing the statistic card.

4. The structure as defined in claim 1, wherein: said film guide means includes a sprocket for meshable guiding engagement with the perforations in perforated film used in the camera.

5. The structure as defined in claim 1, wherein: said film guide means includes a pair of mating rubber rollers for guiding unperforated film used in the camera.

6. The structure as defined in claim 1, wherein: said film guide means includes means for signalling the end of a film leader and the start of a film trailer of a roll of film.

7. The structure as defined in claim 1, including: means for disabling said shutter operating means to allow a film leader and a film trailer to be wound onto the take-up spool without operating the shutter means.

8. The structure as defined in claim 1, including:

(*a*) a pair of synchronized photographic lights mounted adjacent the front side of the camera and on opposite sides thereof, and (*b*) a control circuit including switch means operated by said shutter operating means for energizing said lights when said shutter means is operated to expose said exposure opening.

References Cited in the file of this patent

UNITED STATES PATENTS

| | | |
|---|---|---|
| 1,324,887 | Folmer | Dec. 16, 1919 |
| 2,107,074 | Hineline | Feb. 1, 1938 |
| 2,339,657 | Smith | Jan. 18, 1944 |
| 2,406,152 | Levine | Aug. 20, 1946 |
| 2,496,329 | Briechle | Feb. 7, 1950 |
| 2,552,250 | Bornemann | May 8, 1951 |
| 2,676,514 | Eaton | Apr. 27, 1954 |
| 2,769,380 | Rapaport | Nov. 6, 1956 |